(12) United States Patent
Horng et al.

(10) Patent No.: US 8,193,678 B2
(45) Date of Patent: Jun. 5, 2012

(54) COIL UNIT FOR MOTOR STATOR

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 465 days.

(21) Appl. No.: 12/554,957

(22) Filed: Sep. 7, 2009

(65) Prior Publication Data

US 2011/0057536 A1    Mar. 10, 2011

(51) Int. Cl.
    *H02K 3/04* (2006.01)
(52) U.S. Cl. .................... 310/208; 310/71; 310/67 R
(58) Field of Classification Search .............. 310/71, 310/67 R, 201, 208
    See application file for complete search history.

(56) References Cited

U.S. PATENT DOCUMENTS

| | | | | |
|---|---|---|---|---|
| 4,668,884 | A | * | 5/1987 | Amao et al. ................ 310/68 R |
| 4,728,390 | A | * | 3/1988 | Yamamoto et al. ............. 216/48 |
| 4,737,675 | A | * | 4/1988 | Maemine et al. ............ 310/268 |
| 4,947,072 | A | | 8/1990 | Watkins et al. |
| 4,961,017 | A | * | 10/1990 | Kakinoki et al. ............... 310/71 |
| 4,962,329 | A | * | 10/1990 | Fujita et al. ................... 310/208 |
| 5,808,390 | A | | 9/1998 | Miyazawa et al. |
| 6,144,281 | A | * | 11/2000 | Lorris ........................... 336/200 |
| 6,573,624 | B2 | | 6/2003 | Park |
| 6,815,851 | B2 | * | 11/2004 | Nishikata et al. .......... 310/67 R |
| 7,291,956 | B2 | * | 11/2007 | Itoh et al. ...................... 310/208 |
| 2002/0175575 | A1 | * | 11/2002 | Nishikata et al. ............... 310/71 |
| 2005/0285470 | A1 | * | 12/2005 | Itoh et al. ...................... 310/208 |
| 2008/0018187 | A1 | * | 1/2008 | Yamaguchi et al. ........... 310/81 |
| 2008/0088191 | A1 | * | 4/2008 | Park et al. ....................... 310/71 |

\* cited by examiner

*Primary Examiner* — Thanh Lam
(74) *Attorney, Agent, or Firm* — Alan Kamrath; Kamrath IP Lawfirm, PA

(57) ABSTRACT

A coil unit for a motor stator includes a plurality of layout layers. At least one coil and a conductive portion electrically connected to the at least one coil are formed on a surface of each layout layer. The conductive portions of two adjacent layout layers are electrically connected to each other. An insulting layer is provided between two adjacent layout layers. The coil unit can be coupled to a face of a substrate to form a motor stator with reduced axial height and reduced volume.

20 Claims, 5 Drawing Sheets

COIL UNIT FOR MOTOR STATOR

BACKGROUND OF THE INVENTION

1. Field of the Invention

The present invention relates to a coil unit for a motor stator and, more particularly, to a coil unit for reducing an axial height and a volume of a motor stator.

2. Description of the Related Art

FIG. 1 shows a conventional motor stator 8 including a plurality of silicon steel plates 81, two insulating sleeves 82, and a coil unit 83. Each silicon steel plate 81 includes a ring 811 and a plurality of supporting arms 812 extending radially outward from an outer periphery of the ring 811. A distal end of each supporting arm 812 forms a magnetic pole face 813. After the silicon steel plates 81 are stacked up, the insulating sleeves 82 are mounted to two ends of the stacked silicon steel plates 81. Each insulating sleeve 82 includes a plurality of extensions 821 corresponding to the supporting arms 812. The coil unit 83 includes a plurality of coils 831 wound around the respective supporting arms 812 and the respective extensions 821 to form the motor stator 8.

However, the stacked silicon steel plates 81 cause limitation to reduction in the axial height of the motor stator 8. Furthermore, the insulating sleeves 82 required for insulating and protecting the silicon steel plates 81 and the coil unit 83 result in an increase in the volume and the axial height of the motor stator 8. Further, the coils 831 wound around the supporting arms 812 and the extensions 821 also increase the axial height of the motor stator 8. Thus, when the motor stator 8 is utilized in a motor shown in FIG. 2, the total volume and the axial height of the motor can not be effectively reduced, leading to difficulties in miniaturization of the motor.

FIG. 3 shows another conventional motor stator 9 including a substrate 91 and a coil unit 92 comprising a plurality of coils 921 fixed to a side of the substrate 91. The silicon steel plates 81 and the insulating sleeves 82 of the motor stator 8 are not required, reducing the overall axial height and volume. However, the coils 921 of the coil unit 92 protruding beyond the side of the substrate 91 still has a certain height in the axial direction, leading to difficulties in reduction of the overall axial height of the motor stator 9 and in designs of compact and miniature motors.

SUMMARY OF THE INVENTION

An objective of the present invention is to provide a coil unit for a motor stator to reduce the axial height of the motor stator.

Another objective of the present invention is to provide a coil unit for a motor stator to reduce the volume of the motor stator.

A further objective of the present invention is to provide a coil unit for a motor stator including more coils with more turns.

A coil unit for a motor stator according to the preferred teachings of the present invention includes a plurality of layout layers. At least one coil and a conductive portion electrically connected to the at least one coil are formed on a surface of each of the layout layers. The conductive portions of two adjacent layout layers are electrically connected to each other. An insulting layer is provided between two adjacent layout layers. The coil unit can be coupled to a face of a substrate to form a motor stator with reduced axial height and reduced volume.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
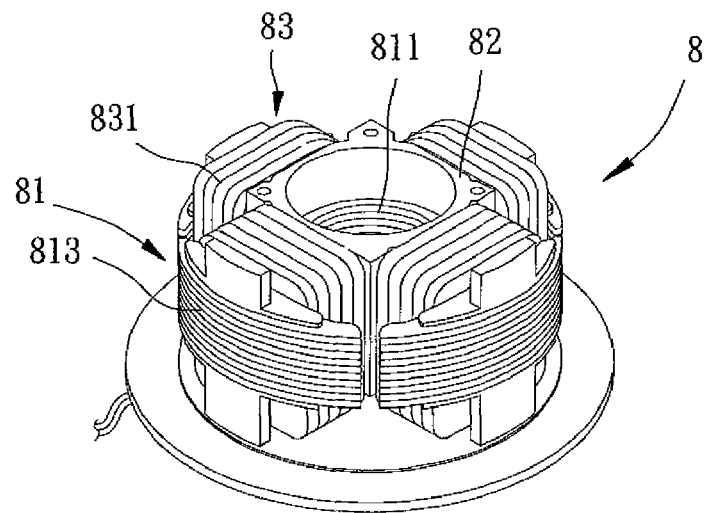
FIG. 1 shows a perspective view of a conventional motor stator.
Figure 2:
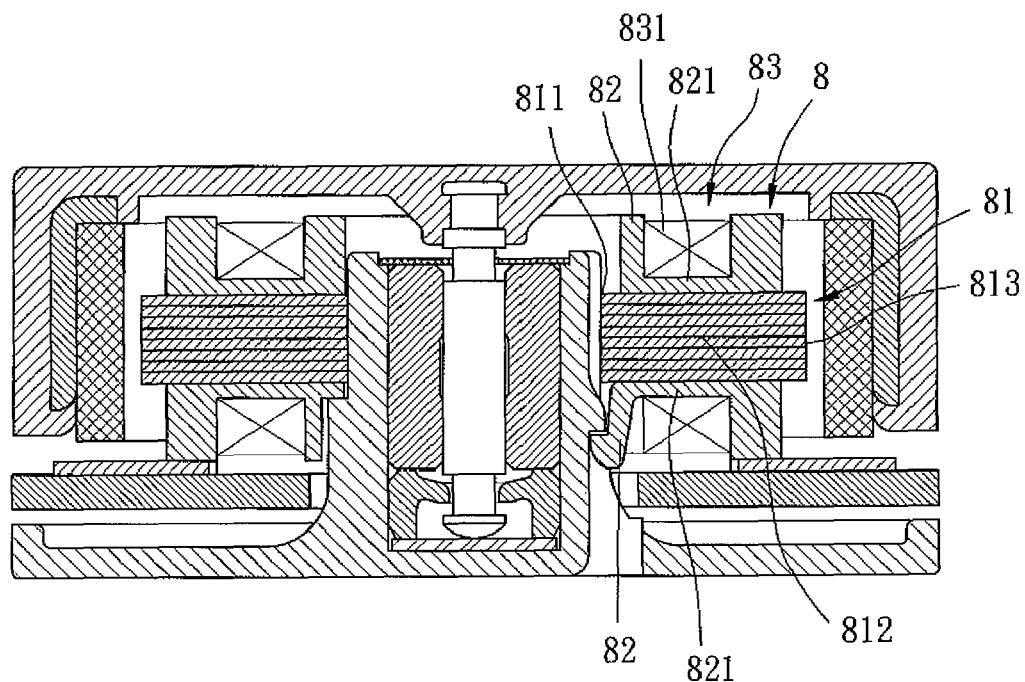
FIG. 2 shows a cross sectional view of a motor including the motor stator of FIG. 1.
Figure 3:
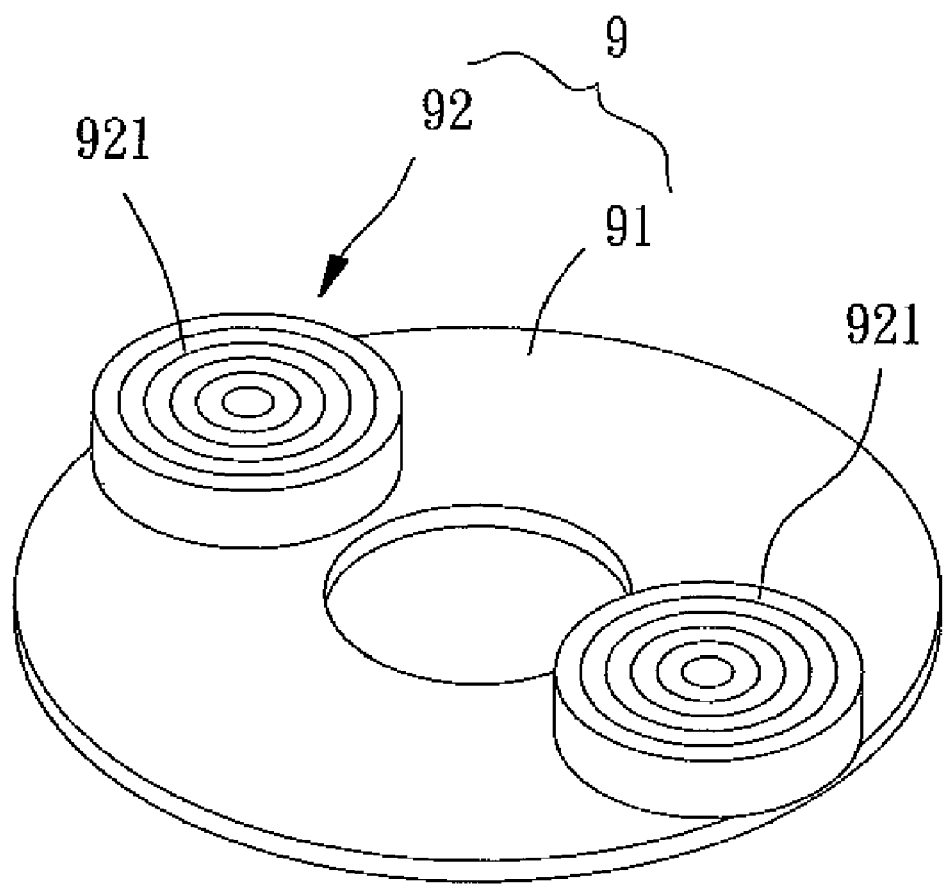
FIG. 3 shows a perspective view of another conventional motor stator.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms. "first", "second", "axial", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 4:
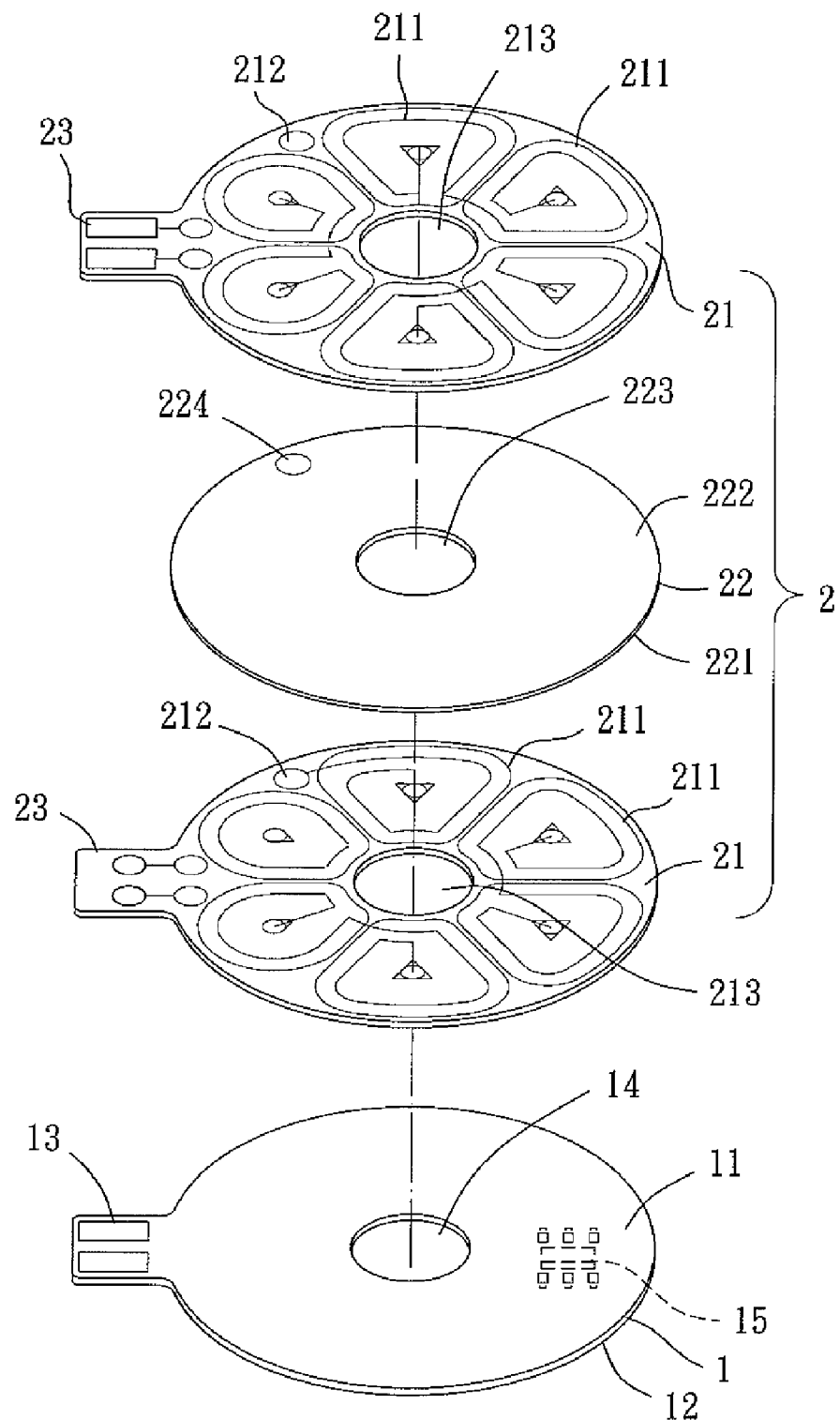
FIG. 4 shows an exploded, perspective view of a motor stator according to the preferred teachings of the present invention.

A motor stator according to the preferred teachings of the present invention is shown in FIG. 4. The motor stator includes a substrate 1 and a coil unit 2 coupled to a side of the substrate 1 to effectively reduce an overall axial height and a volume of the motor stator.

The substrate 1 can be a printed circuit board and includes first and second faces 11 and 12 spaced along an axis. The coil unit 2 is coupled to the first face 11 of the substrate 1 and includes a plurality of layout layers 21 each having a surface on which a plurality of coils 211 and a conductive portion 212 electrically connected to the coils 211 are formed. The layout layers 21 are stacked along the axis. An insulting layer 22 is provided between two adjacent layout layers 21. The conductive portions 212 of two adjacent layout layers 21 are electrically connected to each other. It can be appreciated that the surface of each layout layer 21 can include only one coil 211. Furthermore, the surface of each layout layer 21 can include more than one conductive portion 212.

The insulating layer 22 can be an insulating plate 221 to provide better support for the layout layer 21. Or, the insulating layer 22 can be a plastic film 222 for any two adjacent layout layers 21 to attach thereto, so as to enhance the rigidity of the stacked layout layers 21. Alternatively, the insulating layer 22 can be constructed by an insulating plate 221 and at least one plastic film 222, with the insulating plate 221 having two opposite sides spaced along the axis and the at least one plastic film 222 bonded between at least one of the two opposite sides of the insulating plate 221 and at least one of two adjacent layout layers 21 sandwiching the insulating layer 22.

The substrate 1 can include an electrical connection 13 formed adjacent a peripheral edge thereof for connection with an external drive circuit or an external power source by wires. Likewise, each layout layer 21 can include an electrical connection 23 formed adjacent a peripheral edge thereof for connection with the external drive circuit or the external power source by wires. The electrical connection 23 of each layout layer 21 is aligned with the electrical connection 13 of the substrate 1. Thus, assembling convenience for connection with the power source is enhanced. In a case that the electrical connections 13 and 23 are connected to an external drive circuit, the motor stator according to the preferred teachings of the present invention does not have to include a drive circuit so as to reduce the volume and the axial height of the motor.

The substrate 1 includes a mounting hole 14 extending from the first face 11 through the second face 12. The insulating layer 22 includes a through-hole 223 extending along the axis and aligned with the mounting hole 14. Furthermore, each layout layer 21 includes a through-hole 213 extending along the axis. When the coil unit 2 formed by stacking the layout layers 21 and the insulating layer 22 is coupled to the substrate 1, the through-holes 213 of the layout layers 21 are aligned with the mounting hole 14 of the substrate 1 and the through-hole 223 of the insulating layer 22. Thus, the motor stator according to the preferred teachings of the present invention can be easily mounted to a predetermined portion of a motor, enhancing assembling convenience.

The insulating layer 22 can include an opening 224 aligned with the conductive portions 212 of two adjacent layout layers 21 sandwiching the insulating layer 22. The conductive portions 212 of the two adjacent layout layers 21 can be electrically connected to each other via the opening 224 of the insulating layer 22.

The layout layers 21 are preferably formed by electroforming. As an example, a mold is coupled with a layout layer 21, so as to form the coils 211 and the conductive portion 212 on the surface of the layout layer 21 by electroforming. The layout layer 21 thus formed can be removed from the mold and then coupled to the first face 11 of the substrate 1 to form the motor stator according to the preferred teachings of the present invention. Thus, at least one coil 211 is formed on the surface of the layout layer 21, effectively reducing the axial height of the coil unit 2.

The substrate 1 can include a drive circuit 15 mounted on at least one of the first and second faces 11 and 12. The drive circuit 15 is electrically connected to the coils 211 of at least one layout layer 21 of the coil unit 2. Thus, the substrate 1 can be utilized as a drive circuit board to enhance utility.

The coil unit 2 shown in FIG. 4 includes two layout layers 21 and an insulating layer 22 between the layout layers 21. However, the coil unit 2 can include more layout layers 21 when desired. In an example shown in FIG. 5, the coil unit 2 includes four layout layers 21 with an insulating layer 22 formed between two adjacent layout layers 21. By stacking the layout layers 21, the turns and amount of the coils 211 can be increased to enhance the performance of the motor stator according to the preferred teachings of the present invention.

Figure 5:
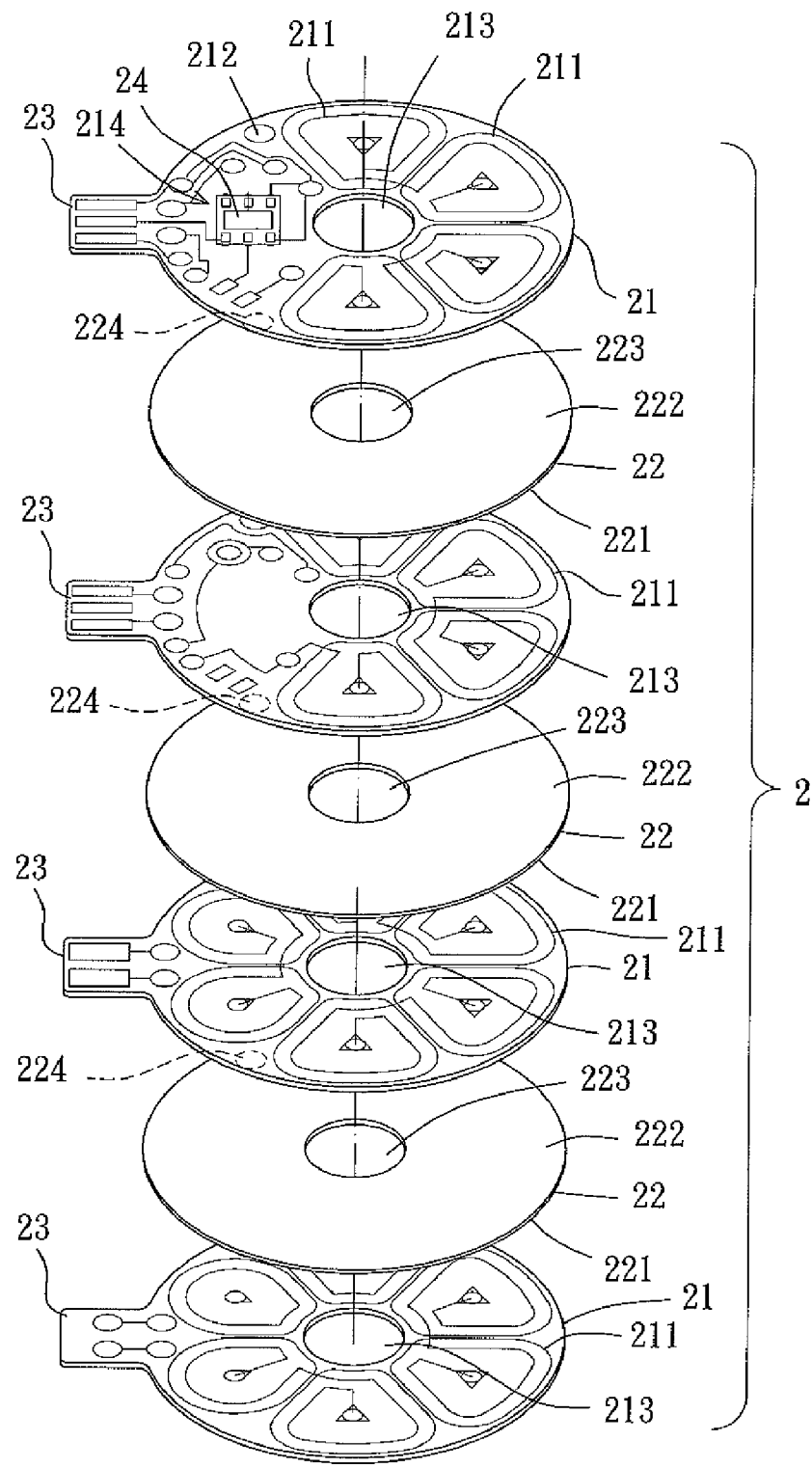
FIG. 5 shows an exploded, perspective view of a coil unit of a motor stator of a modified embodiment according to the preferred teachings of the present invention.

In the preferred form shown in FIG. 5, since the coil unit 2 includes a plurality of layout layers 21, a drive circuit 24 can be directly formed on at least a surface of one of the layout layers 21. As an example, a circuit area 214 can be formed between two adjacent coils 211 of one of the layout layers 21 to provide a space for mounting the drive circuit 24. Thus, the complexity of structure and assembly can be reduced by incorporating the drive circuit 24 into one of the layout layers 21 of the coil unit 2.

Figure 6:
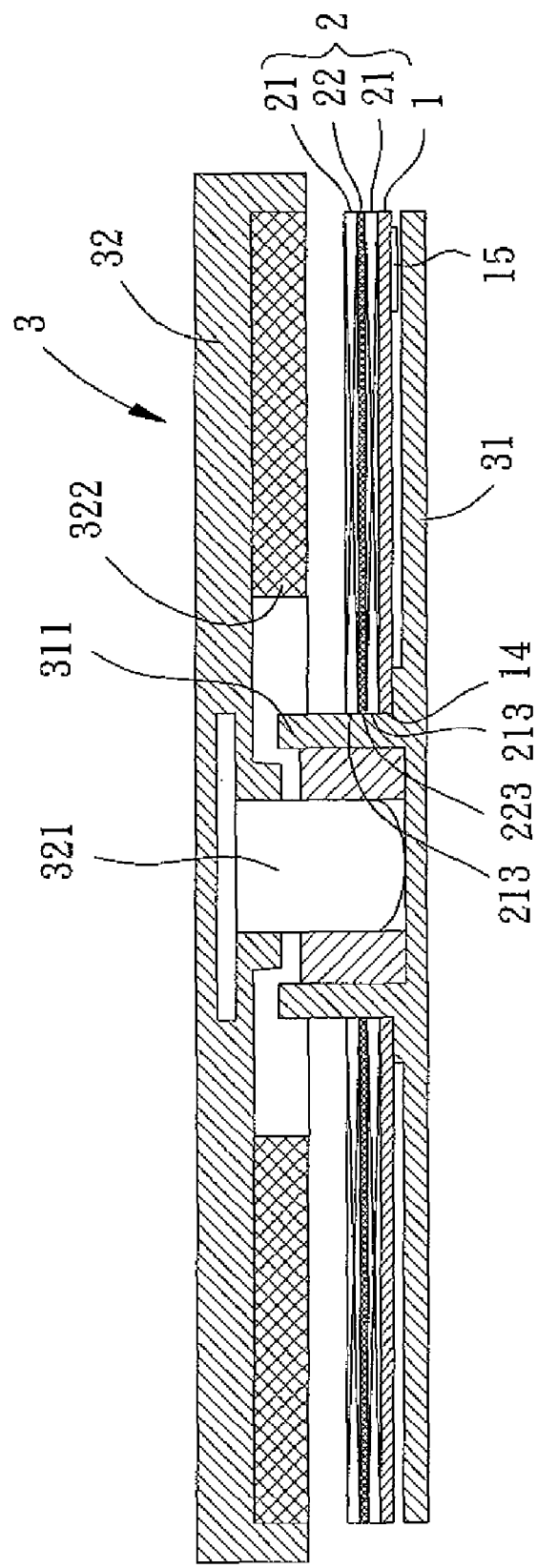
FIG. 6 shows a cross sectional view of a motor utilizing the motor stator of FIG. 4.

With reference to FIG. 6, the motor stator according to the preferred teachings of the present invention can be utilized in a motor 3 including a base 31 having a shaft tube 311. Specifically, the shaft tube 311 is extended through the mounting hole 14 of the substrate 1 and the through-holes 213 and 223 of the coil unit 2 when the substrate 1 and the coil unit 2 are coupled to the base 31, so that the substrate 1 and the coil unit 2 can be more firmly fixed on the base 31. The motor 3 further includes a rotor 32 having a shaft 321 rotatably extending through the shaft tube 311. The rotor 32 further includes a permanent magnet 322 aligned with the coil unit 2. The coil unit 2 interacts with the permanent magnet 322 to drive the rotor 3 to rotate.

By utilizing the coil unit 2 having at least one coil 211 formed on a surface of each layout layer 21, the overall axial height of the motor stator including the coil unit 2 according to the preferred teachings of the present invention can be effectively reduced.

The coil unit 2 of the motor stator according to the preferred teachings of the present invention merely includes a plurality of layout layers 21 and an insulating layer 22 between two adjacent layout layers 21 with the layout layers 21 and the insulating layer 22 stacked along the axis, the volume of the motor stator including the coil unit 2 can be reduced to achieve miniaturization.

Furthermore, by stacking a plurality of layout layers 21, the turns or diameter of the coils 211 of the coil unit 2 of the motor stator can be increased to enhance the performance of the motor stator according to the preferred teachings of the present invention.

As mentioned above, the coil unit 2 and the motor stator including the coil unit 2 have reduced axial heights, reduced volumes, and enhanced performances. The motor stator according to the preferred teachings of the present invention is, thus, suitable for a motor for the purposes of miniaturization while enhancing the operational quality of the motor.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor stator comprising, in combination:
    a substrate including first and second faces spaced along an axis; and
    a coil unit coupled to the first face of the substrate, with the coil unit including a plurality of layout layers each having a surface, with at least one coil and a conductive portion electrically connected to said at least one coil being formed on the surface of each of the layout layers, with an insulting layer being sandwiched between two of the layout layers adjacent to each other, with the conductive portions of two of the layout layers adjacent to each other being electrically connected to each other.

2. The motor stator as claimed in claim 1, with an amount of said at least one coil on the surface of each of the layout layers of the coil unit being more than one, with a circuit area being formed between two of the coils adjacent to each other, and with a drive circuit mounted in the circuit area.

3. The motor stator as claimed in claim 1, with the substrate including a first electrical connection formed adjacent a peripheral edge thereof and adapted to connect to an external drive circuit, and with each of the layout layers including a second electrical connection formed adjacent a peripheral edge thereof and adapted to connect to the external drive circuit.

4. The motor stator as claimed in claim 1, with the substrate including a first electrical connection formed on a peripheral edge thereof and adapted to connect to a power source, and with each of the layout layers including a second electrical connection formed on a peripheral edge thereof and adapted to connect to the power source.

5. The motor stator as claimed in claim 1, with the substrate including a drive circuit mounted on at least one of the first and second faces.

6. The motor stator as claimed in claim 1, with the insulating layer being an insulating plate.

7. The motor stator as claimed in claim 1, with the insulating layer being a plastic film.

8. The motor stator as claimed in claim 1, with the insulating layer including an insulating plate and a plastic film, with the insulating plate having two opposite sides spaced along the axis, with the plastic film bonded between one of the two opposite sides of the insulating plate and one of the layout layers abutting against the insulating layer.

9. The motor stator as claimed in claim 1, with the insulating layer including an opening aligned with the conductive portions of two of the layout layers sandwiching the insulating layer, and with the conductive portions of the two of the layout layers electrically connected to each other via the opening of the insulating layer.

10. The motor stator as claimed in claim 1, with the substrate including a mounting hole extending from the first face through the second face, with the insulating layer including a first through-hole extending along the axis and aligned with the mounting hole, and with each of the layout layers including a second through-hole extending along the axis and aligned with the mounting hole and the first through-hole.

11. The motor stator as claimed in claim 1, with the layout layers being stacked along the axis.

12. A coil unit for a motor stator comprising, in combination:
   a plurality of layout layers each having a surface, with at least one coil and a conductive portion electrically connected to said at least one coil being formed on the surface of each of the layout layers, with the conductive portions of two of the layout layers adjacent to each other being electrically connected to each other; and
   at least one insulting layer each sandwiched between two of the layout layers adjacent to each other.

13. The coil unit as claimed in claim 12, with an amount of said at least one coil on the surface of each of the layout layers of the coil unit being more than one, with a circuit area being formed between two of the coils adjacent to each other, and with a drive circuit mounted in the circuit area.

14. The coil unit as claimed in claim 12, with each of the layout layers including a second electrical connection formed adjacent a peripheral edge thereof and adapted to connect to an external drive circuit.

15. The coil unit as claimed in claim 12, with each of the layout layers including a second electrical connection formed on a peripheral edge thereof and adapted to connect to a power source.

16. The coil unit as claimed in claim 12, with the insulating layer being an insulating plate.

17. The coil unit as claimed in claim 12, with the insulating layer being a plastic film.

18. The coil unit as claimed in claim 12, with the insulating layer including an insulating plate and a plastic film, with the insulating plate having two opposite sides spaced along the axis, with the plastic film bonded between one of the two opposite sides of the insulating plate and one of the layout layers abutting against the insulating layer.

19. The coil unit as claimed in claim 12, with the insulating layer including an opening aligned with the conductive portions of two of the layout layers sandwiching the insulating layer, and with the conductive portions of the two of the layout layers electrically connected to each other via the opening of the insulating layer.

20. The coil unit as claimed in claim 12, with the layout layers being stacked along the axis.

* * * * *